Aug. 8, 1950 J. E. STEWART 2,517,939
LUMBER PACKAGE-RESCALED, DIVISIONAL,
BOUND AND PROTECTIVELY COVERED
Filed May 6, 1949 2 Sheets-Sheet 1
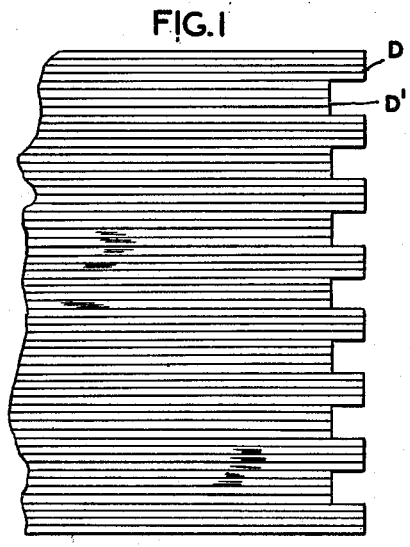
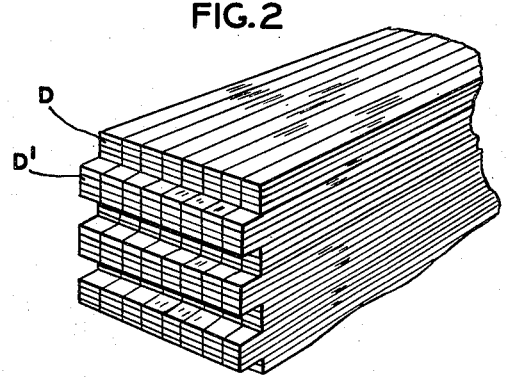
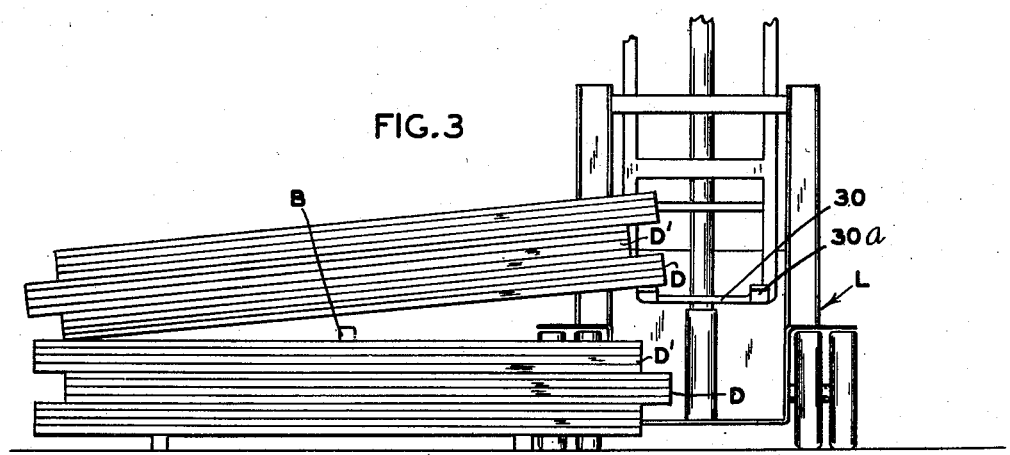
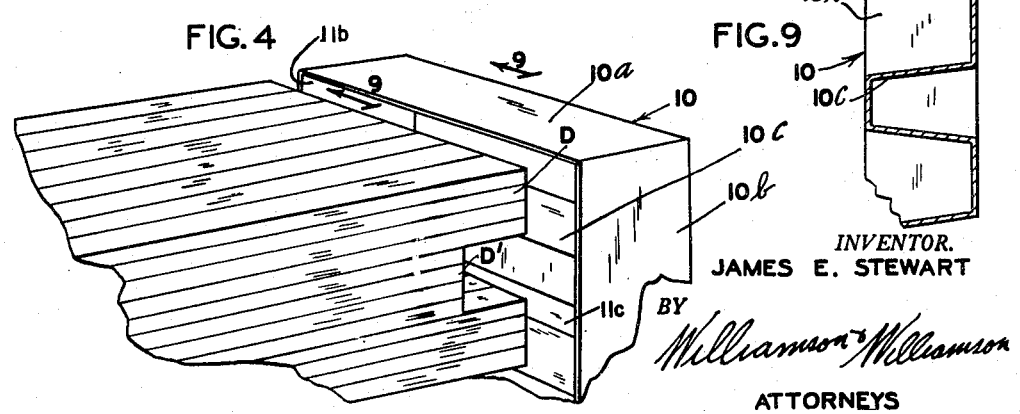
INVENTOR.
JAMES E. STEWART
BY
Williamson & Williamson
ATTORNEYS

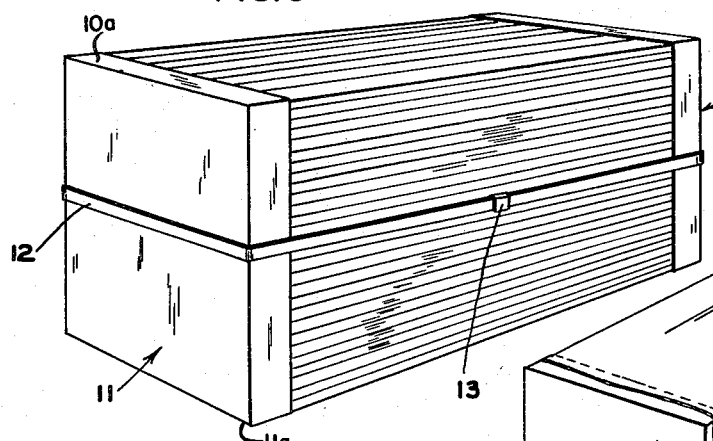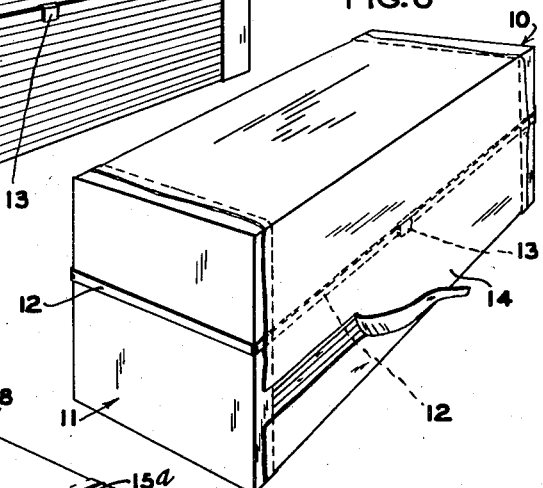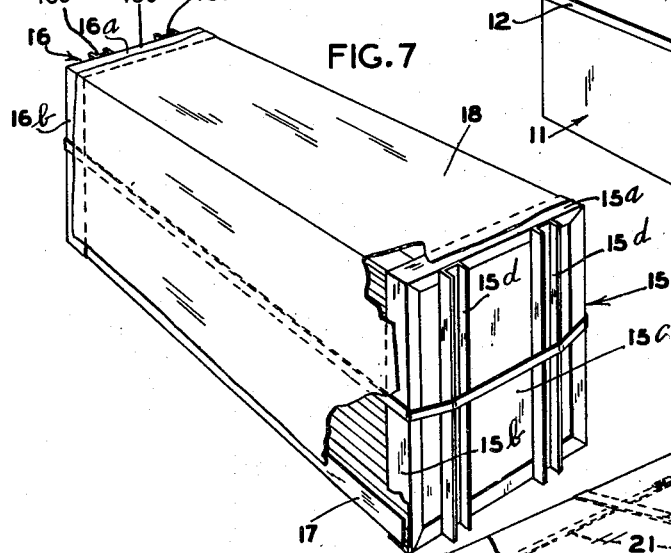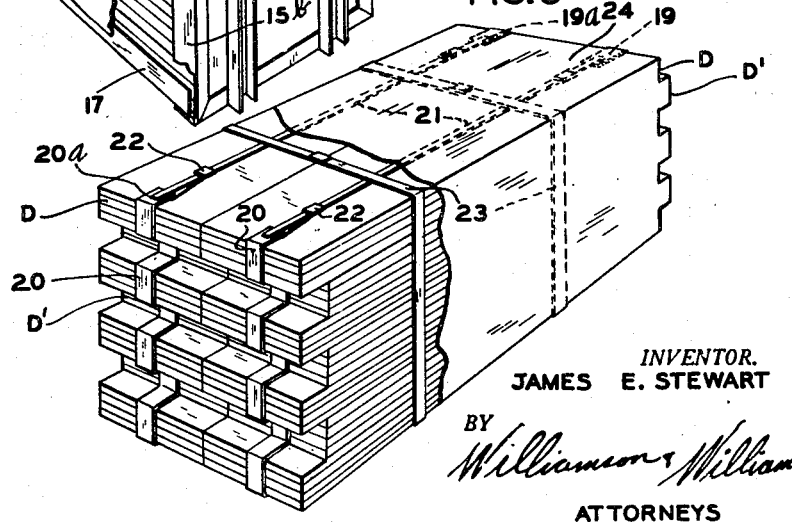

Patented Aug. 8, 1950

2,517,939

UNITED STATES PATENT OFFICE 2,517,939

LUMBER PACKAGE — RESCALED, DIVISIONAL, BOUND, AND PROTECTIVELY COVERED

James Elliott Stewart, Minneapolis, Minn.

Application May 6, 1949, Serial No. 91,654

12 Claims. (Cl. 206—60)

This invention relates to the shipping, handling and storing of lumber or analogous material and particularly to a unit package or stack, the use of which will effect very substantial economies to the producer, the wholesaler and the retail dealer.

Over ninety per cent of all lumber is still shipped by rail in boxcars which necessarily entails the expense of previous tally and scale by mill piece count, carloading expense to the mill, car unloading expense to the wholesaler or retailer and tally and scale expense by retailer piece count when received. Further expense of rescale by retailer when selling, is involved. Statistics show that present scale labor for loading a car costs the mill over $23.00 and unloading by the wholesaler or retailer costs approximately $21.00, totaling for every car of lumber from producer to wholesaler or retailer, in excess of $45.00.

A small percentage of lumber today is shipped on flat or gondola freight cars arriving at destination dirty from soot and dust encountered in transit. In addition, the lumber shipped in loose stacked condition, because of jolting of the cars in switching etc., cause the piles to spill towards each other with the result that often end pieces interlock, causing considerable breakage when the lumber is unloaded by lift truck.

At the present time, both at the mill and in wholesale and retail yards a large area of covered lumber storage is required, costing for building and maintenance, large sums of money.

It is an object of my present invention to provide a unit package of lumber or other superimposed analogous material preferably prescaled, bound and reinforced and protectively coated, which may be stored outdoors indefinitely, without any substantial change in the product as originally manufactured and dried; which may be shipped without injury and with complete protection from elements and dirt upon flat or gondola type cars and which eliminates the need for rescaling by wholesaler or retailer.

A further object is the provision of a unit load or stack of lumber or analogous material and the method of forming the same which enables handling of the unit, division of the unit and handling of composite parts thereof expediently and without rescale, with substantial saving to wholesale and retail yards.

Another object is the provision of a bound and reinforced package unit of lumber or analogous, superimposed multilayer material which will withstand jolts and shaking in shipment without displacement of form and which is peculiarly adapted to be readily divided into composite portions or sections and to be handled as a complete unit or split unit at the lumber yard.

A further object is the provision of a complete bound and reinforced package unit of lumber and the like which is completely protected from dust, dirt and the elements by sectionally removable coating encysting the entire package.

A still further object is the provision of a simple, commercially successful method for forming a reinforced preformed package unit for lumber and the like having a protective coating covering the same.

These and other objects and advantages of my invention will more fully appear from the following description made in connection with the accompanying drawings wherein like reference characters refer to similar parts throughout the several views and in which:

Fig. 1 is a side elevation of one end of a preformed unit or stack of lumber embodying the features of my invention;

Fig. 2 is a perspective view of the same clearly showing the staggered end relations of the several prescaled unit divisions furnishing facilities for economically and accurately dividing the package or stack for split unit delivery and sales;

Fig. 3 is a side elevation of a unit or stack of lumber conforming to the principles of my invention showing application of a conventional fork lift truck to very quickly divide off a desired prescaled portion of the stack to facilitate handling and removal thereof;

Fig. 4 is a fragmentary perspective view showing application of a form-retaining, reinforcing end or bulkhead at one end of the package;

Fig. 5 is a perspective view showing the preformed lumber unit bound and reinforced prior to application of the over-all protective coating thereto;

Fig. 6 is a perspective view illustrating the complete package unit;

Fig. 7 is a perspective view with a portion of the protective coating broken away showing a somewhat different structure and method of protecting the bottom portion of the package as well as reinforcing and retaining the form of the ends thereof;

Fig. 8 is a perspective view of another somewhat different form of package employing form-retaining and reinforcing elements and binding of a different structure from those shown in the preceding views; and Fig. 9 is a fragmentary, vertical section showing the formation of the back of one of the bulkheads 10 taken on the line 9—9 of Fig. 4.

In carrying out my invention, I form at the mill, place of production or lumber kiln, a prescaled, readily divisible load unit or stack as shown in Figs. 1 to 3 comprising a multiplicity of superimposed layers of elongated pieces of lumber or analogous construction material, stacked or piled in parallelopiped fashion with the longitudinal sides of the stack or unit lying substantially in common vertical planes, but with the ends of the unit defined by transverse division channels or serrations to facilitate subsequent separation, division and handling of the unit to obtain substantial advantages as will later appear.

One unit load or stack comprises a number of prescaled, multi layer divisions D and D', being longitudinally offset by several inches at the ends of the unit to provide shouldered separation channels of preferably in excess of three inches in height. The longitudinally offset sectional ends of the load or unit may be formed as the individual boards or other structural elements are scaled by piece count, at the mill or a stack of lumber in the usual parallel end formation may be transformed into my preferred prescaled divisional structure by longitudinally displacing alternate multilayer sections to produce the longitudinally offset ends of the unit.

In the formation of my package unit for shipment and storage, I provide form-retaining and reinforcing members for my preformed and prescaled, divisible load unit or stack. The form of said form-retaining and reinforcing members shown in Figs. 4 to 6 inclusive, comprises a pair of (right and left hand) bulkheads 10 and 11 constructed preferably from noncorrosive or galvanized sheet metal, substantially rigid but having a degree of resiliency and provided with upper and lower flanges 10a and 11a for overlying the upper and lower edges of the stack and side flanges 10b and 11b for overlying the vertical side edges of the ends of the stack or load unit. The body or back wall of the members 10 is bent or otherwise formed in a shape substantially complementary to the serrated or offset shape of the ends of the stack or load unit but with the protruding tenon members or projections 10c and 11c being wedge shape in cross section to wedgedly interfit the channels formed at the end of the stack. The upper and lower flanges 10a and 11a of the bulkheads may be integrally formed with the body or back and the side flanges 10b and 11b are rigidly secured at their extremities to the ends of these flanges as by welding.

It will of course be understood that right and left forms of bulkheads must be constructed to interfit the respective right and left ends of the prescaled and preformed stack or load unit.

Fig. 4 illustrates the manner in which the bulkheads are applied to the load unit or stack. They are forced or driven lightly upon the ends of the unit and serve to retain the preformed shape of the unit ends while very substantially reinforcing the ends and entire package.

As shown in Fig. 5, after application of the form-retaining and reinforcing bulkheads 10 and 11, the package is bound together by suitable means such as a horizontally and circumferentially disposed, heavy metal tape 12 which longitudinally surrounds the entire package at approximately medial height and has its ends secured together by a conventional metal tape fastener 13.

Additional binding elements disposed transversely of the package may be employed but with my bulkheads 10 and 11, the single metal tape is adequate for purposes of shipment, handling and storage of the unit.

I prefer to encyst the entire prescaled, preformed and reinforced and bound package, as shown in Fig. 5, with a water and dust-proof coating of a material which will withstand transit, handling and storage, but which may be torn off in sections, generally along desired lines of fracture. To this end, as shown in Fig. 6, all portions of the package with the exception of the ends are coated as by spraying with a waterproof, elastic and fire-resistent composition which will not be absorbed by the lumber or by bonding thereto. Various compositions or solutions capable of being effectively sprayed may be employed, such as a composition consisting in vinyl chloride acetate rosin with tricresyl phosphate, the proportions being varied in accordance with the desired thickness and elasticity of the package coating 14. Other coatings utilizing latex in acetate with various pigments may also be utilized, although plastic coatings are preferred. Such coatings may be sprayed and will not be absorbed by the wood or bonded thereto. They may be split and torn either transversely or longitudinally of the package.

As shown in Fig. 6, the package is sprayed at top, bottom and sides with the coating substantially overlapping the flanges of the bulkheads, but not quite covering the same and of course, the ends of the bulkheads 10 and 11 need not be sprayed. The entire coating is indicated by the numeral 14 cooperating with the form-retaining and reinforcing bulkheads 10 and 11 to completely seal, cover and protect the entire package and overlying the binding tape 12.

In Fig. 7 a somewhat different lumber package is illustrated wherein the successive layers of boards are stacked in bundle form with their ends lying in substantially vertical planes. This package is well adapted for smaller load units where subsequent division or split technique in the retail yard, is usually unnecessary. Right and left hand bulkheads 15 and 16 respectively, are employed of somewhat different structure from those used in the first form of my invention described. These bulkheads comprise rectangular sheet metal cover lids having perpendicular top and bottom flanges 15a and 16a respectively and side flanges 15b and 16b respectively, which flanges overlie the horizontal and vertical edges of the rectangular load unit. The flanges are preferably constructed from angle iron and form a rectangular frame in which is received a sheet metal back member 15c or 16c for the respective bulkheads. I prefer to reinforce the bulkheads at their outer rear faces, by a pair of vertical channel members 15d and 16d respectively.

In the second form of the invention, before application of the bulkheads 15 and 16 and preferably as the stack is being formed, a sheet of tough, flexible, waterproof paper or other material such as sisal craft 17, underlies and is wrapped about the bottom of the package, preferably being folded upwardly at the longitudinal sides thereof. The bulkheads are inserted upon the stack overlying the edges of the sheet 17 as clearly shown in Fig. 7 and retaining the sheet in the folded position. Thereafter, the sides and top of the package are sprayed with the protective coating 18 to complete the package.

In Fig. 8, another form of form-retaining and reinforcing medium is illustrated. Here, the unit load or stack is formed in the manner first described with prescaled sections D and D' being longitudinally offset at the ends of the unit. Reinforcing and retaining irons 19 and 20 are interfitted at the ends of the stack to retain the form and divisions and to reinforce the package. The irons 19 are constructed from rigid strap metal such as galvanized iron of considerable thickness, two of said irons 19 as shown, being formed of complementary shape to the right hand end of the package and two of said irons 20 being of complementary shape to the left hand ends.

The corresponding irons 19 and 20 snugly fitted to the ends of the load unit, are interconnected and securely bound to form with the lumber, an integral package by flexible binding elements such as the strong metal tapes 21 extending longitudinally at the top and bottom of the package, as shown having their ends passed through slots 19a and 20a, formed in the inturned upper and lower extremities of the irons. The doubled ends of the tapes 21 are secured together by fasteners 22. With this construction, it is desirable to apply one or more binding tapes 23 transversely and circumferentially of the package as shown in Fig. 8. The entire package may be spray coated with a protective coating 24 of similar composition or compositions to the coatings described with reference to the first form of the invention. The protective coating 24 in this form of the invention of course, covers the ends as well as all other portions of the package.

The coated, reinforced and bound lumber package unit in any one of the forms illustrated in Figs. 6, 7 and 8, can be shipped or stored in all weather conditions for an unlimited period of time. The lumber is actually air sealed and the composition of the coating is preferably at least repellent to fire or if possible, substantially fire proof.

My units may be shipped in open type railroad cars and swerving of the cars and jolting in switching can not cause displacement of any of the sections or boards or damage to abutting packages due to the protected and strongly reinforced ends of the package. Quantities of units may be stored outside at lumber mill as well as in wholesale and retail lumber yards. Thus, necessity of substantial closed lumber storage as well as expensive maintenance of the same is greatly curtailed, both at the mill and the lumber outlet establishments.

In its preferred forms, as shown in Figs. 6 and 8, not only is the total unit scaled and the count known at the mill but the various sections or divisions D and D' of the package are prescaled and of predetermined footage, thereby eliminating need for tally and rescaling at points of loading and unloading and in the lumber yard. The form and structure of my load unit or stack itself as illustrated in Figs. 1 to 3, constitutes a material advance in the art and offers several important advantages. The stack may be readily divided to fill an order without requiring rescaling and is particularly adapted to division and handling by conventional loading apparatus such as lift trucks.

In Fig. 3 the separation of three prescaled sections of a stack is shown very quickly effected by a lift truck L with its forks 30a connected by cross member 30 disposed transversely of the stack and with one thereof underlying the projecting end of one of the divisions D. A bolster or divider beam B is placed between the separate portion and the balance of the stack whereafter the three upper sections are supported upon the divider or preferably two dividers and the lift truck may then be moved to cause the forks to transversely underlie the middle portion of the stack for removal of the divided section. In split unit sales or deliveries to consumer, only a comparatively few boards will need to be scaled at the yard since the several defined sections of the unit are of known footage. After a unit has been broken or split, if desired the remainder of the unit may then be taken to a closed or covered lumber storage area but as lumbermen well know, only a relatively very small quantity of broken units would require covered storage.

In filling orders at the yard, the end bulkheads from a unit are first removed, exposing the ends which in offset relation, define "lift" divisions. Then the protective coating may be easily torn in a strip along the intended line of division longitudinally of the side walls of the package, as illustrated in Fig. 6.

From the foregoing, it will be seen that I have provided a prescaled, protectively coated, reinforced and bound lumber package which can be shipped or stored in all weather conditions for an unlimited period of time and which may be shipped in flat or gondola type railroad cars. Cost of loading and unloading from a producer to retail yard is very materially reduced at present levels of labor effecting a saving of approximately $38.00 per car by use of my package and method. Standard packages and prescaled package sections make possible "sight" inventories. Rehandling of a large portion of lumber sold at the yard is eliminated through the use of my unit. Furthermore, with my completely protected fire-repellent package, insurance rates and fire hazards will be materially reduced.

It will further be seen that within the scope of my invention, as illustrated in Figs. 1 to 3 of the drawings, lumber shipped loosely in conventional manner in boxcars may be unloaded at the yard and stacked into the longitudinally offset divisions as shown in Figs. 1 and 2, with very substantial subsequent economies to wholesaler and retailer.

It will of course be understood that various changes may be made in the form, details, arrangement and proportions of the parts without departing from the scope of my invention.

What I claim is:

1. A load or stack unit of lumber or analogous material having in combination a multiplicity of superimposed layers, each layer comprising a plurality of elongated individual pieces disposed in side by side relation, alternating multilayer sections of said unit being disposed in longitudinally offset relation at the ends of said unit, said offset relation leaving shouldered channels in both ends of said unit for reception of a horizontally extending lift element to facilitate separation and handling of a number of predetermined divisions of the unit and each unit being in face contacting relation to an adjacent unit.

2. A load or stack unit of lumber or analogous material having in combination a multiplicity of superimposed layers, each layer comprising a plurality of elongated, individual pieces disposed in side by side relation, alternating, prescaled multilayer sections of said unit being disposed in longitudinally offset relation at the ends of said unit, said unit being of generally rectangular parallelopiped shape, said offset end relation leaving transverse channels in both ends of said unit for reception of a straight, horizontally disposed lifting element to facilitate separation of the unit along a number of predetermined heights thereof and each unit being in face contacting relation to an adjacent unit.

3. A load unit of lumber or analogous material, having in combination a multiplicity of superimposed layers, each layer comprising a plurality of elongated pieces disposed in side by side relation, alternating multilayer sections of said unit being disposed in longitudinally offset relation at the ends of said unit to provide transverse shouldered channels in both ends of the unit for facilitating predetermined divisions of the unit, form-retaining and reinforcing elements having portions complementary in shape to the offset ends of said unit for engaging said ends and retaining said offset relation and binding means for clamping said form-retaining and reinforcing elements against said unit and for binding said unit together into a package.

4. The structure set forth in claim 3 wherein said form-retaining and reinforcing elements comprise a pair of bulkheads for marginally surrounding the ends of said unit and having elements connected therewith for engaging the channeled ends of said unit to retain the form thereof.

5. A load unit of lumber or analogous material, having in combination a multiplicity of superimposed layers, each layer comprising a plurality of elongated pieces disposed in side by side relation, alternating multilayer sections of said unit being disposed in longitudinally offset relation at the ends of said unit to provide transverse shouldered channels in both ends of the unit for facilitating predetermined divisions of the unit, a pair of form-retaining and reinforcing bulkheads for the ends of said unit comprising right and left end cap members having rectangular flanges for snugly overlying the marginal edges of the respective ends of the unit and each having a closed backing or body member tortuously bent in cross sectional shape to complement and fit the corresponding channeled end of the unit and binding means for clamping said bulkheads together against said ends.

6. A unit package of lumber or analogous material reinforced and protectively coated for outside storage and shipment having in combination a multiplicity of superimposed layers, each layer comprising a plurality of elongated pieces disposed in side by side relation, alternate multilayer sections of said multiplicity of layers being vertically aligned with said sections disposed in longitudinally offset relations at the ends of the unit, said offset end relation of sections leaving transverse channels in both ends of the unit for facilitating predetermined divisions thereof, a pair of form-retaining and reinforcing cap members having rectangular flanges for snugly overlying the marginal edges of the right and left ends of the multiplicity of layers respectively and each having a sealed back tortuously bent in cross sectional shape to complement and fit the corresponding channeled end of the unit, binding means for clamping said cap members together against said ends and a moisture-proof, flexible coating of tough but frangible material including at least the top, bottom and longitudinal sides of said structure and having sealed relation with the flanges of said cap members.

7. The method of forming a unit stack of lumber or analogous material, consisting in vertically aligning a plurality of layers of boards or the like to form a bottom division, each layer comprising a plurality of boards disposed in side by side relation, then superimposing a second division in face contacting relation to the bottom division comprising a plurality of vertically aligned layers of boards or the like in side-by-side relation with the ends of said second division longitudinally offset from the ends of the bottom or first division and continuing to build a stack by alternately offsetting multi layer divisions in the manner specified for said first two divisions to form a unit stack with transverse channeled ends, the channels of said ends being adapted to receive a straight, horizontally disposed lifting element to facilitate separation of the unit along divisional lines.

8. A load unit of lumber or analogous material, having in combination a multiplicity of superimposed layers, each layer comprising a plurality of elongated pieces disposed in side by side relation, alternating multi layer sections of said unit being disposed in longitudinally offset relation at the ends of said unit to provide transverse shouldered channels in both ends of the unit for facilitating predetermined divisions of the unit, form retaining and reinforcing elements for the ends of said unit comprising for each end, at least one rigid member tortuously shaped to complement the shape of the appropriate offset end of the unit and having inwardly extending attachment flanges at the extremities thereof extending over the upper and under surfaces of the unit, binding means for clamping the two sets of rigid members together against the ends of said unit and binding means including the unit transversely of said first mentioned binding means.

9. The structure set forth in claim 8 and a moisture-proof coating of flexible material encysting the entire unit, said rigid members and said binding means.

10. A unit package of lumber or analogous material reinforced and protectively coated for outside storage and shipment having in combination a multiplicity of superimposed layers, each layer comprising a plurality of elongated pieces disposed in side by side relation, alternate multilayer sections of said unit being vertically offset at the ends of the unit, said offset end relation of sections leaving transverse channels in both ends of the unit for facilitating predetermined divisions thereof and a tough coating of flexible water-proof material, covering at least the top and adjacent portions of the longitudinal sides and ends of said unit, said coating being adhered to the material covered to the extent of forming a tight bond between all pieces of lumber covered.

11. A unit package of lumber or analogous material having in combination a multiplicity of superimposed layers, each layer comprising a plurality of elongated pieces disposed in side by side relation, said layers having their longitudinal edges substantially aligned to form a unit, alternate multilayer sections of said unit being vertically offset at the ends of the unit, said offset end relation of sections leaving transverse channels in both ends of the unit for facilitating predetermined divisions thereof, flexible bonding elements surrounding said unit and securing the same in the form of a compact parallelopiped and a tough, moisture-proof plastic coating covering at least the top and adjacent portions of the longitudinal sides and ends of said unit, said coating being adhered to the material covered to the extent of forming a tight bond between the pieces covered while nevertheless being strippable from the unit.

12. A unit package of lumber having top, bottom, ends and sides, reinforced and protectively coated for outside storage and shipment, including a multiplicity of units of superimposed layers with the layers of each unit being substantially in end alignment and with the ends of at least some of the units being out of alignment with adjacent units, each unit of the layer comprising a plurality of pieces of lumber disposed in side by side unconnected relation, a plurality of narrow relatively non-stretchable binding elements surrounding said unit package circumferentially of the length thereof and disposed in widely spaced relation with respect to each other for retaining and binding said unit package of lumber together, and a spray coating of tough, flexible, elastic and moisture-proof material applied on and covering at least the top of the unit package and the adjoining sides below the top and also covering that portion of the binding elements on the top and the adjoining sides below the top, thereby reinforcing and protecting the unit package, said coating being of such thickness, toughness, and elasticity that it can be partially or totally removed by stripping same from the unit package.

JAMES ELLIOTT STEWART.

REFERENCES CITED

The following references are of record in the file of this patent:

UNITED STATES PATENTS

| Number | Name | Date |
|---|---|---|
| 242,369 | Ritter | May 31, 1881 |
| 1,600,720 | Denison | Sept. 21, 1926 |
| 1,664,635 | Magill | Apr. 3, 1928 |
| 1,785,360 | Poyzant | Dec. 16, 1930 |
| 1,913,864 | Walper | June 13, 1933 |
| 2,012,219 | Chambers | Aug. 20, 1935 |
| 2,021,037 | Walper | Nov. 12, 1935 |
| 2,075,178 | Copeman | Mar. 30, 1937 |
| 2,204,781 | Wattles | June 18, 1940 |
| 2,441,227 | Pineles | May 11, 1948 |